United States Patent

Schuler et al.

(10) Patent No.: US 9,092,038 B2
(45) Date of Patent: Jul. 28, 2015

(54) VARIABLE FLOW RATE ANALOG OUTPUT PNEUMATIC (AOP) TRANSDUCER

(75) Inventors: Michael S. Schuler, Chicago, IL (US); Dmitri Chapovalov, Park Ridge, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 254 days.

(21) Appl. No.: 13/362,118

(22) Filed: Jan. 31, 2012

(65) Prior Publication Data

US 2013/0192675 A1 Aug. 1, 2013

(51) Int. Cl.
*F16K 31/04* (2006.01)
*G05D 16/20* (2006.01)
*F16K 11/16* (2006.01)

(52) U.S. Cl.
CPC ............ *G05D 16/202* (2013.01); *F16K 11/161* (2013.01); *G05D 16/2053* (2013.01)

(58) Field of Classification Search
CPC ... G05D 16/202; F16K 15/186; F16K 11/105; F16K 11/161; F15B 11/10
USPC ........... 137/102, 487.5, 627.5, 596.2, 596.17, 137/636.1
See application file for complete search history.

(56) References Cited

U.S. PATENT DOCUMENTS

| | | | | | |
|---|---|---|---|---|---|
| 2,342,770 | A | * | 2/1944 | Temple | 137/636.1 |
| 3,058,489 | A | * | 10/1962 | Corbett | 137/627.5 |
| 3,403,700 | A | * | 10/1968 | Meynell | 137/636.1 |
| 3,779,280 | A | * | 12/1973 | Evans et al. | 137/625.5 |
| 3,805,840 | A | | 4/1974 | Byers | |
| 4,445,538 | A | * | 5/1984 | Bilski | 137/596.2 |
| 4,630,631 | A | | 12/1986 | Barnes | |
| 4,951,712 | A | * | 8/1990 | Becker | 137/636.1 |
| 5,094,260 | A | | 3/1992 | Stuart et al. | |
| 5,152,320 | A | * | 10/1992 | Zimmerly | 137/625.5 |
| 6,228,019 | B1 | * | 5/2001 | Phillips et al. | 600/19 |
| 2002/0011272 | A1 | | 1/2002 | Kim et al. | |
| 2002/0023681 | A1 | * | 2/2002 | Ellis et al. | 137/596.2 |

FOREIGN PATENT DOCUMENTS

EP 0921322 A2 9/1999

OTHER PUBLICATIONS

PCT Search Report dated Apr. 12, 2013, for PCT Application No. PCT/US2013/023842. (11 pages).

* cited by examiner

*Primary Examiner* — Craig Schneider
*Assistant Examiner* — Minh Lee

(57) ABSTRACT

A variable flow device includes a body supporting a first orifice and a second orifice, and a drive mechanism. The variable flow device further includes a first valve actuator coupled to the drive mechanism and linearly shiftable between a first open position and a first closed position, the first valve actuator incorporates a first valve stem including a first conical portion sized to symmetrically engage the first orifice when the first valve stem is shifted to the first closed position, and a second valve actuator coupled to the drive mechanism and linearly shiftable between a second open position and a second closed position, the second valve actuator incorporates a second valve stem including a second conical portion sized to symmetrically engage the second orifice when the second valve stem is shifted to the second closed position.

22 Claims, 6 Drawing Sheets

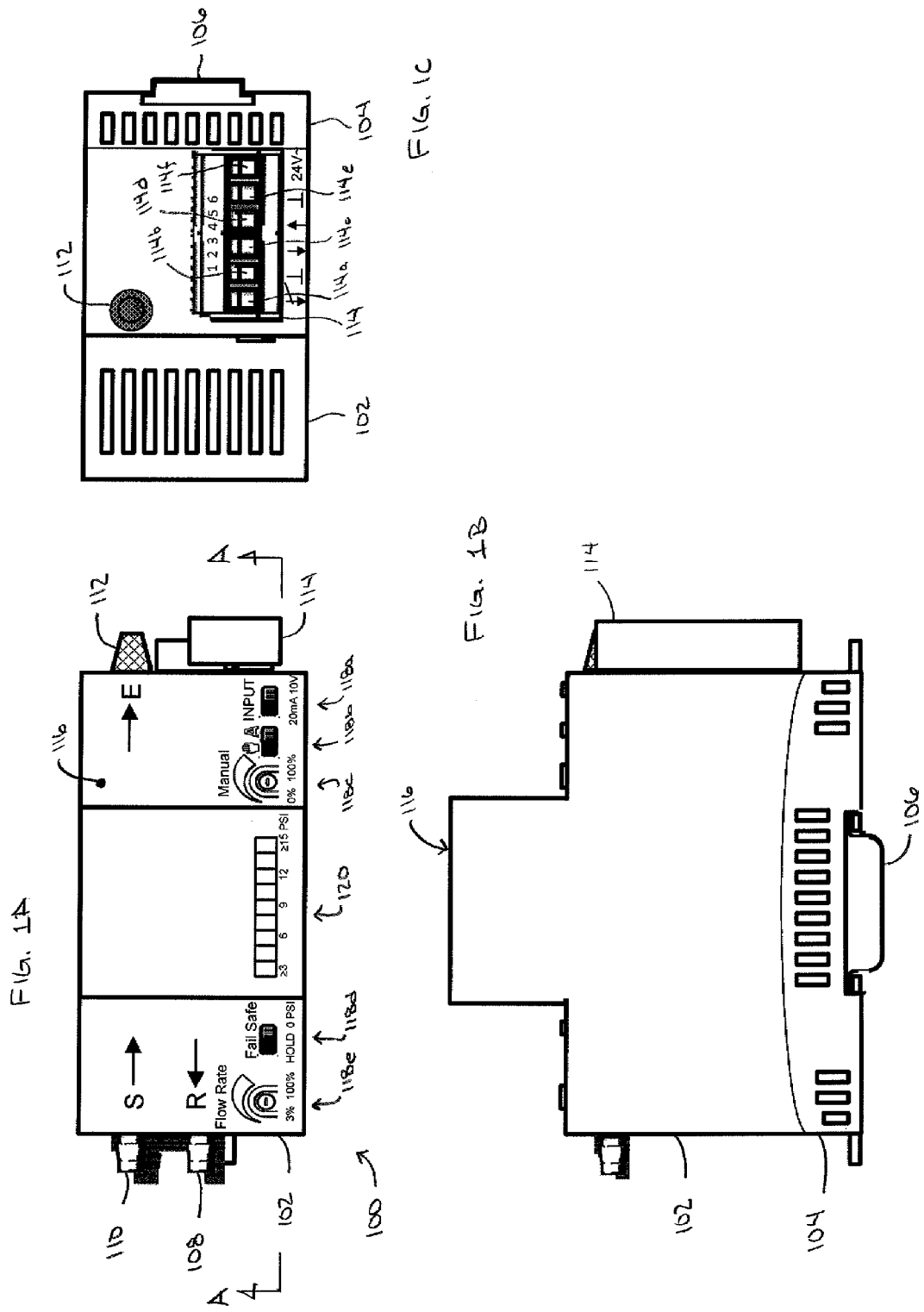

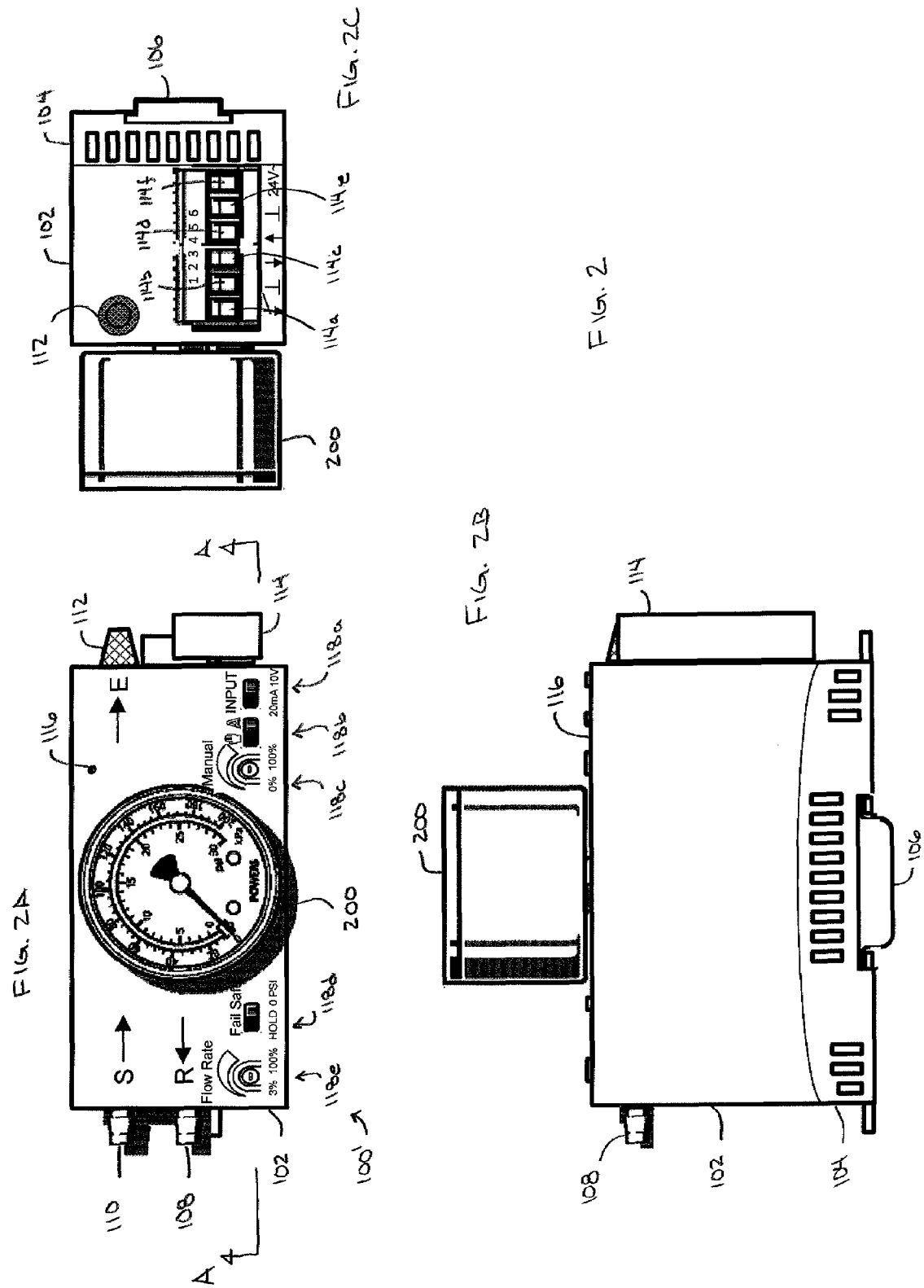

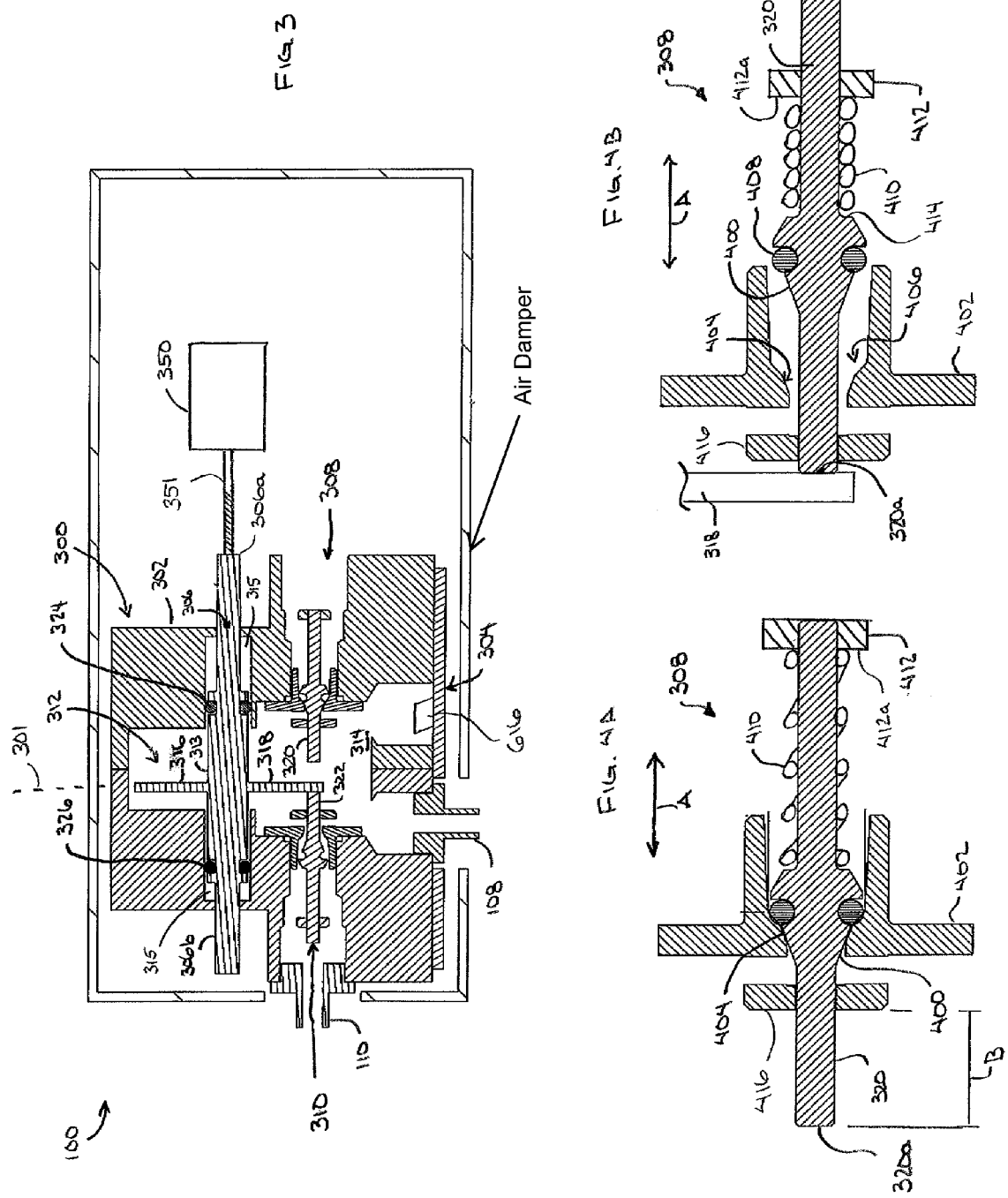

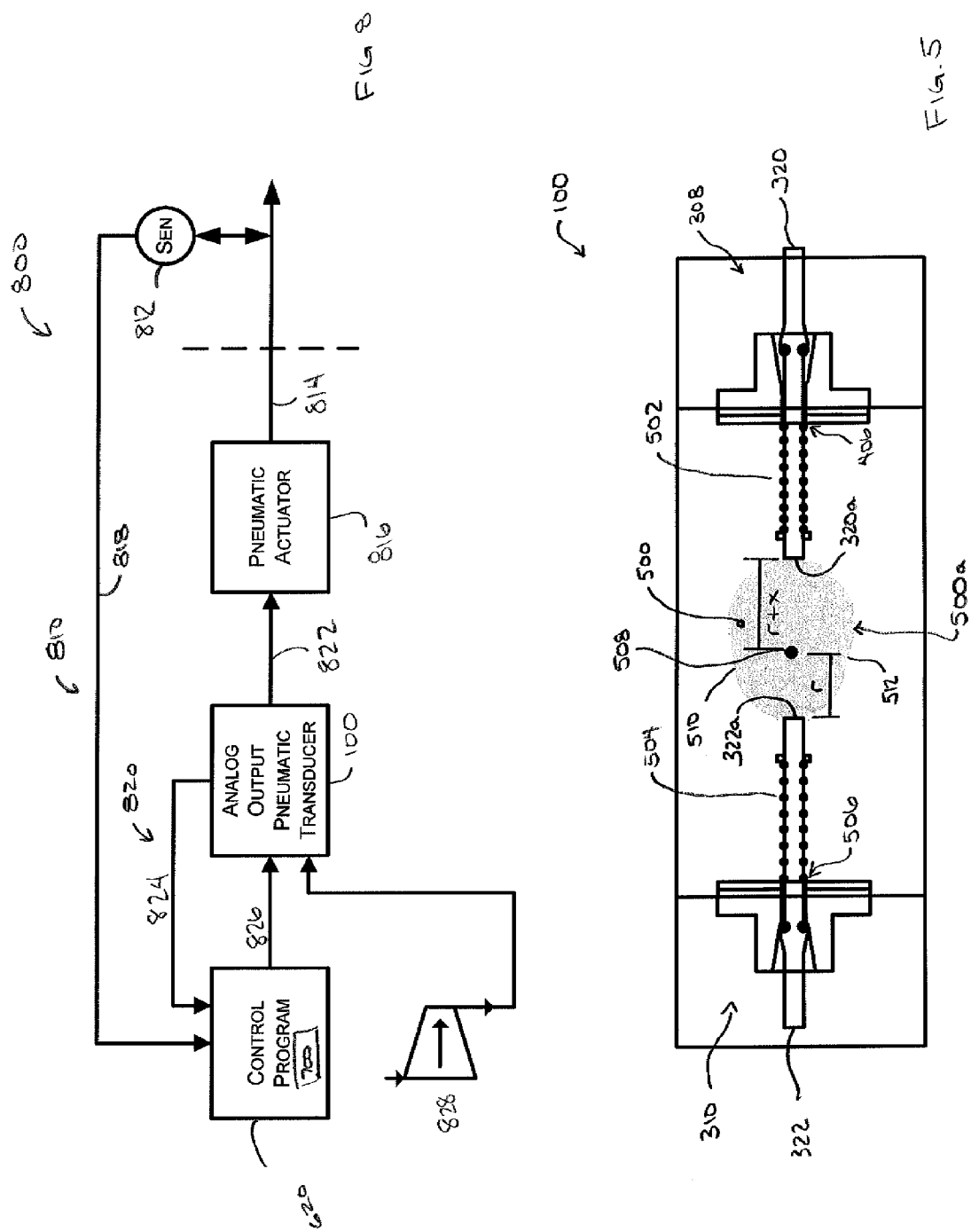

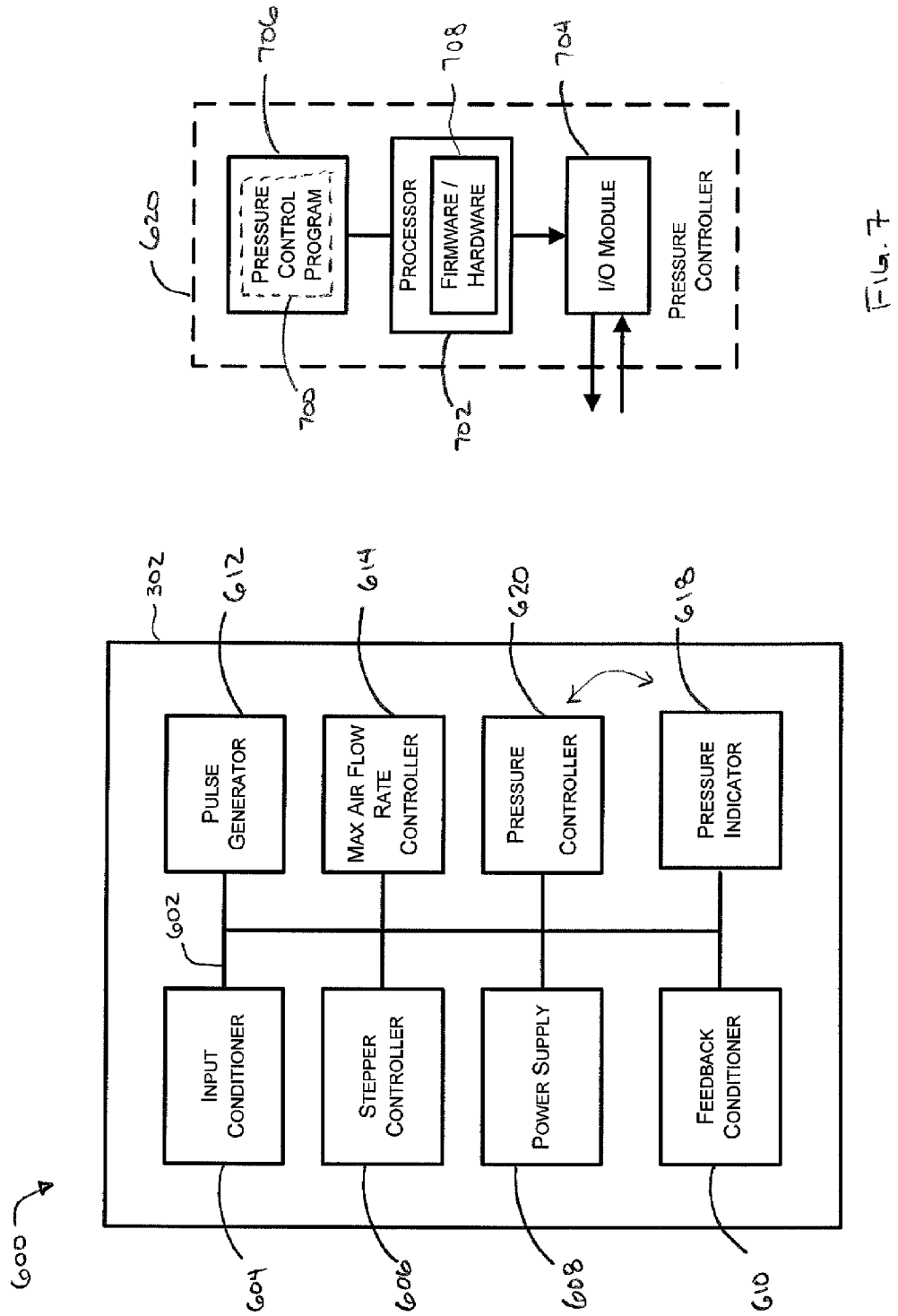

VARIABLE FLOW RATE ANALOG OUTPUT PNEUMATIC (AOP) TRANSDUCER

TECHNICAL FIELD

This patent document generally relates to fluid flow rate control and specifically to fluid flow rate control via a variable flow rate device configured to produce an analog fluid output.

BACKGROUND

Conventional flow regulators and transducers provide and maintain a constant flow rate independent of changes in the pressure at measured at either the inlet or the outlet. To maintain the desired flow rate, conventional flow regulators and transducers incorporate a fixed orifice calibrated to the desired flow capacity (gallons per minute (gpm), liters per minute (l/min.) or standard cubic inches per minute (SCIM)). Because each orifice is calibrated to a specific flow rate, it is necessary to select and employ a new orifice in order to modify the flow rate for a given application.

In operation, these known flow regulators and transducers convert a voltage or current signal into a corresponding air pressure at the specified flow rate dictated by the orifice. Flow regulators and transducers controlled in this manner are effective across a limited range of pressures. Outside of this limited range, known flow regulators and transducers experience oscillation and overshoot due to the fast switching between off and on required for control.

The necessity of maintaining and storing multiple flow regulators and transducers required to cover a wide operational range increases the cost of ownership and carrying costs incurred by the user.

SUMMARY

This patent document discloses multiple embodiments and configurations of flow regulators and transducer modules configured according to the inventive principles described herein. This patent document further discloses methods and configurations for controlling and operating the flow regulators and transducer modules configured according to the inventive principles described herein. In one embodiment, a variable flow rate analog output pneumatic (AOP) transducer (referred to herein as a "variable airflow module") is disclosed. In this exemplary embodiment, the variable flow rate AOP transducer or variable airflow module is configured to provide variable or adjustable fluid flow control over a range of pressures. An exemplary variable airflow module may include, among other things, a housing structure, a pneumatic subassembly and an electronic subassembly. The pneumatic subassembly may be implemented utilizing either a linear stepper motor configuration or a cam and servo configuration to drive a linear actuating pin controlling a pair of airflow valves. The electronic subassembly may be configured to provide the control signals and commands generated by processor executable instructions. The variable airflow modules may be operated as a component of a closed loop process.

In one embodiment, an exemplary variable airflow module includes a pneumatic subassembly that utilizes a linear stepper motor to drive a linear actuating pin configured to alternately engage and control the position of a supply actuator and a exhaust (or bleed) actuator as directed by control signals and commands provided by the electronic subassembly. For example, the linear actuating pin can include a post extending through the pin body or a flange encircling the pin body. The post or flange may be aligned to alternately engage a valve stem portion of the air supply actuator and/or a valve stem portion of the exhaust actuator. Each valve stem includes a conical portion sized to linearly engage and symmetrically cooperate with an orifice. The orifice may be designed and configured to seal against air and other fluid flow when engaged against an outer surface of the conical portion. In operation, the cooperation of the orifice and conical portion of the valve stem can change or alter the flow area of the orifice and thereby change the flow rate. By changing the flow rate with respect to either the supply port (via the supply actuator) or exhaust port (via the exhaust port actuator) in this manner, the resulting flow through the return port can be varied over a wide range of pressures in order to correspondingly control the movement of a pneumatic actuator portion of, for example, an air damper, a valve or similar device configured to control the flow of fluid through a duct or channel.

In yet another embodiment, the pneumatic subassembly utilizing a linear stepper motor and linear actuating pin can be replaced with a pneumatic subassembly utilizing a servo motor and cam configuration. The cam can include an appropriate dwell portion corresponding to both air supply and exhaust valves and valve stems in a closed position; an exhaust portion corresponding to the exhaust valve and valve stem in an open position; and a supply portion corresponding to the supply valve and valve stem in an open position. The transition of each valve stem from the closed position to the open position may be a gradual one. In this embodiment, the air supply and exhaust valve stems are biased in contact with the cam such that rotational movement by the cam produces linear motion in the valve stems.

In one embodiment, a variable flow device includes a body supporting a first orifice and a second orifice, a drive mechanism. The variable flow device includes a first valve actuator coupled to the drive mechanism and linearly shiftable between a first open position and a first closed position, the first valve actuator further having a first valve stem including a first conical portion, wherein the first conical portion is sized to symmetrically engage the first orifice when the first valve stem is shifted to the first closed position, and a second valve actuator coupled to the drive mechanism and linearly shiftable between a second open position and a second closed position, the second valve actuator having a second valve stem including a second conical portion, wherein the second conical portion is sized to symmetrically engage the second orifice when the second valve stem is shifted to the second closed position, and wherein the drive mechanism is configured to direct the first valve stem portion to control the first valve actuator and the second valve stem portion to control the second valve actuator.

In yet another embodiment, a variable flow device includes a body having a first orifice and a second orifice, wherein the first orifice is in fluid communication with the second orifice via a fluid chamber, means for translation of a drive pin between a first position and a second position, wherein the drive pin includes an actuating post extending substantially orthogonal from an outer surface of the drive pin, a first valve actuator including a first valve stem configured to symmetrically engage the first orifice, wherein the first valve stem is shiftable relative to the first orifice in response to the translation of the actuating post substantially adjacent to the first position, and a second valve actuator including a second valve stem configured to symmetrically engage the second orifice, wherein the second valve stem is shiftable relative to the second orifice in response to the translation of the actuating post substantially adjacent to the second position.

In another embodiment, a method for variable flow control of a fluid to an actuator by a transducer device including a body having a first orifice in fluid communication with a supply port, and a second orifice in fluid communication with an exhaust port, wherein the first orifice is further in fluid communication with the second orifice via a fluid chamber having a fluid output port is disclosed. The method includes receiving an electrical signal representative of a pressure set point, calculating, in response to the received electrical signal, a flow rate corresponding to the pressure set point, generating a position signal that corresponds to the flow rate associated with the pressure set point, selecting one of a first valve actuator and a second valve actuator as an active valve actuator, wherein the first valve actuator is arranged to selectively engage the first orifice and wherein the second valve actuator is arranged to selectively engage the second orifice, and positioning, in response to the generated position signal, a conical portion of the selected active valve actuator adjacent to one of the first or second orifices, wherein the conical portion and the orifice cooperate to define a flow area corresponding to the flow rate.

Other embodiments are disclosed, and each of the embodiments can be used alone or together in combination. The exemplary variable airflow module may be or include an analog regulator that includes a mechanical pressure gauge. In another embodiment, the exemplary variable airflow module may be or include an analog regulator that includes a linear mechanical pressure gauge. In yet another embodiment, the variable airflow module may be or include a digital regulator that includes a light emitting diode (LED) array to indicate the pressure. Additional features and advantages of the disclosed embodiments are described in, and will be apparent from, the following Detailed Description and the figures.

BRIEF DESCRIPTION OF THE FIGURES

FIGS. 1A to 1C illustrate an embodiment of a variable airflow module including a pneumatic subassembly and an electronic subassembly constructed according to the present disclosure, where FIG. 1A depicts a top view of the variable airflow module, FIG. 1B depicts a side view of the variable airflow module, and FIG. 1C depicts another side view of the variable airflow module;

FIGS. 2A to 2C illustrate another embodiment of a variable airflow module including a pneumatic subassembly and an electronic subassembly constructed according to the present disclosure;

FIG. 3 is a cross-sectional view of the variable airflow module including a linear stepper motor and linear actuating pin configuration of a pneumatic subassembly taken along the section line A-A as shown in FIGS. 1A and 2A;

FIGS. 4A and 4B are enlarged view of an exemplary valve actuator configured for use to control air flow through the variable airflow module, the valve actuator are shown in a closed position in FIG. 4A and an open position in FIG. 4B;

FIG. 5 is a cross-sectional view of an alternate configuration of the variable airflow module shown in FIGS. 1A and 2A including a servo motor and cam configuration of a pneumatic subassembly taken along the section line A-A shown in FIGS. 1A and 2A;

FIG. 6 illustrates an exemplary controls architecture that may be implemented in connection with one or more of the disclosed variable airflow modules and pneumatic configurations;

FIG. 7 illustrates an exemplary process controller configured according to the present disclosure;

FIG. 8 illustrates an exemplary process control loop configured according to the present disclosure.

DETAILED DESCRIPTION

Figure 9:
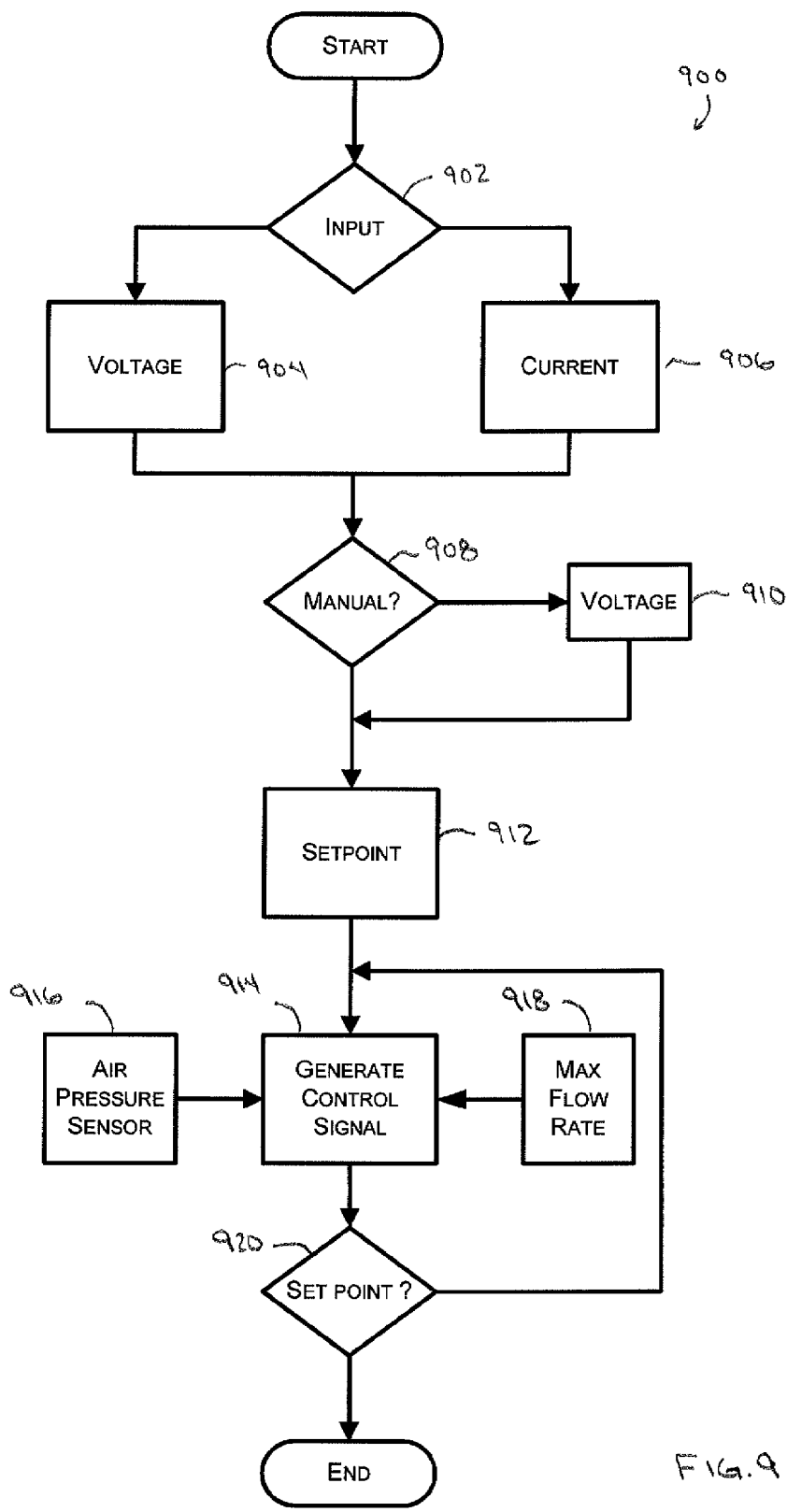
FIG. 9 is an exemplary internal control process that may be implemented by the controls architecture shown in FIG. 6.

The present disclosure relates to a variable flow rate analog output pneumatic (AOP) transducer (referred to herein as a "variable airflow module") and methods for controlling variable airflow valves. In particular, the present disclosure relates to a double acting airflow control device that utilizes a single means for positioning and translation to drive and control a first valve actuator and a second valve actuator. In one embodiment, the means for positioning and translation may include a linear stepper motor configured to position an actuating or drive pin that mechanically engages and drives valve stems integral to each of the valve actuators. In another embodiment, the means for positioning and translation may include a servo motor and rotary cam configured to cooperate and engage with the spring-loaded and extended valve stems. In another embodiment, each of the valve stems includes or carries a conical portion sized to symmetrically engage a complimentary orifice. In operation, the linear position of the conical portion relative to the orifice determines the size (i.e., the area) of the flow path defined there between. By altering the size of the flow path, the flow rate may be adjusted and controlled in response to a wide range of input pressures.

FIGS. 1A to 1C illustrate an embodiment of a variable airflow module 100 constructed according to the present disclosure. FIG. 1A depicts a top view of the variable airflow module 100, FIG. 1B depicts a side view of the variable airflow module 100, and FIG. 1C depicts another side view of the variable airflow module. The variable airflow module 100 includes a housing 102 and a base 104. The base 104 may be manufactured to engage a Deutsches Institut für Normung (DIN) compatible rail 106 configured in compliance with, for example, the applicable International Electrotechnical Commission (IEC) standard. For example, IEC Standard 60715 specifies the dimensions and layout for a mechanical support designed to carry electrical devices. The housing 102 includes and supports a return or output port 108, a supply port 110 and an exhaust or bleed port 112. Both the return and supply ports 108 and 110 may be a ¼" outer diameter (OD) barbed port sized to couple with, for example, flexible air and other fluid tubing. The exhaust port 112 (which in one embodiment exhausts air or other fluids to the atmosphere) may, in this exemplary embodiment, include an exhaust muffler configured to reduce exhaust noise levels to the atmosphere in compliance with Occupational Safety and Health Administration (OSHA) requirements for workplace safety and health. As discussed in further detail herein, the variable airflow module 100 selectively controls the air or other fluid supplied to the supply port 110 and exhausted through exhaust or bleed port 112 in order to regulate the fluid flow and pressure through the return or output port 108 to a connected pneumatic actuator.

The housing 102 may further support an input 114 such as a terminal block or connector. The input 114 may be a plug-in terminal block including a plurality of terminal block connectors 114a to 114f configured to accept and establish a wired connection. For example, the wired connections may include, for example, a 24-volt (V) alternating current (VAC) power input 114f; a digital output 114a; an analog set point input 114b; and a analog feedback voltage 114c. The digital output 114 may be utilized to indicate whether the variable airflow module 100 is operating according to a manual input or an automatic input (see control 118b). For example, if the digital output 114a is set to off (which may be a logical zero (0) value), the variable airflow module 100 operates according to an automatic input (e.g., corresponding to a setting of control input 118*b*). Conversely, if the digital output 114*a* is set to on, the variable airflow module 100 operates according to a manual input (e.g., corresponding to another setting of control input 118*b*). The analog set point input 114*b* may accept, for example, a direct current voltage (VDC) range of 0 to 10 VDC representing a pressure range of 0 to 20 pounds per square inch gauge (PSIG) or relative pressure; or a direct current range of 4 to 20 milliamps (mA) representing a pressure range of 3 to 15 PSIG and providing input power. The analog feedback may be utilized to provide a range of 0 to 5 VDC representing a pressure range of 0 to 20 PSIG.

A top surface 116 of the housing 102 may support a plurality of control inputs 118*a* to 118*e* (generally identified by the reference numeral 118). In one embodiment, the control input 118*a* may select or switch the operation of the variable airflow module 100 between a voltage input and a current input. Similarly, the control input 118*b* may switch variable airflow module 100 between manual and automatic operation. The control input 118*c* may be a pot or knob for manual adjustment of a desired flow rate threshold or level. The control input 118*d* determines the action of the variable airflow module 100 in the event of a failure. For example, the control input 118*d* may, in the event of a failure, direct the variable airflow module 100 to either hold the current pressure or dump the pressure to atmosphere via the exhaust or bleed port 112. The control input 118*e* may be used to manually adjust the output flow rate between, for example, an operating range of 3% to 100%. The top surface 116 many further include an operating pressure scale 120. The operating pressure scale 120 may cooperate with the drive mechanism 350 and an indicating portion 314 of the actuating post 310 to mechanically register the pressure on the operating pressure scale 120 (see FIG. 3).

FIGS. 2A to 2C illustrate an alternate embodiment 100' of the variable airflow module 100. FIG. 2A, similar to FIG. 1A, depicts a top view of the alternate variable airflow module, FIG. 2B depicts a side view of the variable airflow module, and FIG. 2C depicts another side view of the variable airflow module. The top surface 116 of the variable pressure airflow module 100' may include a mechanical pressure gauge 200 having, for example, a range between 0 and 30 PSI and/or 0 to 200 kilopascals (kPa).

FIG. 3 is a sectional view of the variable airflow module 100 taken along the section line A-A illustrating an exemplary pneumatic subassembly 300 utilizing a linear drive mechanism. The exemplary pneumatic subassembly 300 includes a body 302 coupled to and supporting a printed circuit board (PCB) 304. The PCB 304 may support and electrically couple the hardware and control modules discussed and described in connection with FIGS. 6 and 8. In one embodiment, the body 302 may support an actuating pin 306. The actuating pin 306 may be incrementally and continuously translated horizontally relative to a central axis 301 of the body 302, representing a neutral position between a first position and a second position. The first position may coincide with a first valve actuator 308 in a full open position and a second valve actuator 310 in a full closed (see FIG. 4A) position. The second position may coincide with the second valve actuator 310 in a full open position (see FIG. 4B) and the first valve actuator 308 in a full closed position. The actuating pin 306 may be positioned at any desired location between the first position and the second position. In one embodiment, the actuating pin 306 may be positioned in a neutral position that coincides with both actuators 308 and 310 in closed positions. In order to alter or adjust the position of the individual valve actuators 308 and 310 (and the flow rate of air through the variable airflow module 100), the actuating pin 306 may include an actuating post 312 that extends from a central body or member 313 of the pin 306 into a fluid chamber 314 and aligns orthogonally to the longitudinal axis of the body 313 of the actuating pin 306. The actuating post 312 includes the indicator portion 316 arranged to cooperate with the operating pressure scale 120 (see FIG. 1). The actuating post 312 further includes an actuating portion 318 arranged and aligned to cooperate with pistons or valve stems 320 and 322 of the first and second valve actuators 308 and 310, respectively. In one embodiment, the indicator portion 316 and the actuating portion 318 may be formed integral to the body 313 of the actuating pin 306. In another embodiment, the indicator portion 316 and the actuating portion 318 may be separate pins or posts coupled to the body 313 of the actuating pin 306. In operation, movement of the actuating pin 306 within a channel 315 (formed internally within the body 302 and substantially orthogonal to the center longitudinal axis 301 of the body 302) causes the indicator portion 316 and the actuating portion 318 to translate relative to the central axis 301.

The actuator pin 306 may be coupled to the drive mechanism 350 at a first end 306*a*. The drive mechanism 350 may be a linear stepper motor having an extendible drive or worm shaft 351 configured to incrementally translate the actuator pin 306 between the first position and the second position. In one embodiment, the drive mechanism 350 may be a SAIA® JOHNSON ELECTRIC® type UAL stepper motor having a drive shaft 351 with a 20 millimeter (mm) diameter and a 30 mm length. In this exemplary embodiment, the drive mechanism 350 may be controlled and driven by a model A4985 DMOS microstepping driver with translator and overcurrent protection provided by ALLEGRO MICROSYSTEMS, INC.® (See FIG. 6). The movement of the linear stepper motor causes the coupled drive shaft 351 and actuator pin 306, and the fixedly attached actuating portion 318 of the actuating post 312, to linearly translate relative to the body 302 and the actuators 308 and 310. The actuator pin 306 further includes a first O-ring 324 carried substantially adjacent to the first end 306*a*. The first O-ring 324 cooperates with and provides sealing contact between the actuator pin 306 and the body 302 to seal the fluid chamber 314 against undesirable fluid leaks at the first end 306*a*. A second O-ring 326 disposed substantially adjacent to the second end 306*b* similarly seals the actuator pin 306 relative to the body 302 and the fluid chamber 314 to inhibit or prevent undesirable fluid leaks.

In operation, the actuating portion 318 of the actuating post 312 selectively engages one of the valve stems 320 of the first valve actuator 308 and the valve stem 322 of the second valve actuator 310 to control the flow rate of fluid there through. The configuration and operation of the first valve actuator 308 is mirrored and complemented by the second valve actuator 310. In particular, the first valve actuator 308 controls and adjusts the exhaust airflow within the chamber 314 in cooperation with the actuating portion 318 of the actuating post 312 and the drive mechanism 350 while the second valve actuator 310 controls and adjusts the supply airflow within the chamber 314 in a similar manner.

FIGS. 4A and 4B are an enlarged view of the first valve actuator 308 in a closed position (see FIG. 4A) and an open position (see FIG. 4B). Because the structure of the first valve actuator 308 is mirrored in the structure of the second valve actuator 310; only the configuration of the first valve actuator 306 will be discussed in connection with FIGS. 4A and 4B. It should be understood that the description of the first valve actuator 308 relates and describes the configuration and operation of the second valve actuator 310. In operation, the movement of the first and second valve actuators 308 to 310 is controlled by either embodiment of the pneumatic subassembly 300. Thus, either the linear stepper motor configuration or the cam and servo configuration of the pneumatic subassembly 300 may drive the linear actuating pin 306 to control the position of the first and second valve actuators 308 to 310.

FIG. 4A illustrates the first valve actuator 308 in the closed position. The closed position is characterized by a conical portion 400 of the valve stem or piston 320 abutting and engaging an orifice portion 402 defined within the body 302 of the pneumatic subassembly 300. The orifice portion 402 may be manufactured or formed directly or integrally into the body 302 of the pneumatic subassembly 300. Alternatively, the orifice portion 402 may be a separate component mounted or carried within the body 302. The conical portion 400 of the valve stem or piston 320 may be symmetrically aligned relative to the circular mouth or opening 404 of the orifice portion 402 where the conical portion 400 tapers towards the circular mouth or opening 404. The valve stem or piston 320 may be further guided relative to the orifice portion 402 via a guide member 416. The guide member 416 supports the movement of the valve stem 320 and prevents fluid flow from directly entering into the chamber 314. In operation, the circular cross section of the conical portion 400 compliments and aligns with the circular mouth 404 of the orifice portion 402 to define a flow path 406 (see FIG. 4B) for the fluid and/or air within the chamber 314. The area or size of the flow path 406 can be adjusted and controlled by translating the conical portion 400 of the piston or valve stem 320 relative to the circular mouth 404 of the orifice portion 402 as indicated by the arrow A in FIGS. 4A and 4B. For example, as the leading tapered edge of the conical portion 400 enters the circular mouth 404, the overall area of the flow path 406 decreases as the distance B of the valve stem 320 entering the chamber 314 increases which, in turn, results in a decrease in the fluid or air flow rate through the first valve actuator 308. Similarly, as the distance B of the valve stem 320 entering the chamber 314 decreases, the area of the flow path 406 increases allowing a higher fluid flow rate there through. An O-ring 408 may be carried by the valve stem 320 to prevent unwanted fluid leakage when the conical portion 400 is disposed and sealed against the circular mouth 404 of the orifice portion 402 (see FIG. 4A).

In the illustrated embodiment, the valve stem 320 is biased towards the closed position (see FIG. 4A) by a compression spring 410 bearing against an internal surface 412*a* of a stopper 412 carried within the body 302 and a back surface 414 of the conical portion 400. Thus, when the valve stem 320 is at rest, the compression spring 410 forces or biases the conical portion 400 into contact with the circular mouth 404 of the orifice portion 402 to close or seal the flow path 406 from the chamber 314. In operation, the actuating post 318 of the actuating pin 306 may engage a tip 320*a* of the valve stem 320 as shown in FIG. 4B. As the drive mechanism 350 such as the linear stepper motor moves the pin 306 and the attached actuating post 318 and the tip 320*a* towards the orifice portion 402, the movement causes the compression spring 410 to compress against the fixed surface 412 (i.e., the distance B decreases) and the area or size of the flow path 406 associated with the valve stem 320 increases. The increased area of the flow path 406 allows for a proportional increase in the fluid flow. In a similar manner, the flow path 406 and the fluid flow can be modified and optimized by varying the position (i.e., the distance B) of the valve stem 320 and the conical portion 400 relative to the circular mouth 406 of the orifice portion 402.

In operation, the drive mechanism 350 retracts from a neutral position (i.e., a position in which the actuating post 318 is not in contact with either valve stem 320 and 322) and the actuating post 318 contacts or engages the tip 320*a* of the valve stem 320 to enlarge the flow path 406 and increase the exhaust airflow. Similarly, when the drive mechanism 350 extends away from the neutral position and the actuating post 318 contacts the valve stem 322 to enlarge the flow path of the second valve actuator 310 and increase the supply airflow.

FIG. 5 illustrates a sectional view of another embodiment of the pneumatic subassembly 300 taken along the section line A-A of the variable airflow module 100 shown in FIGS. 1 and 2. In this exemplary embodiment, the linear stepper motor arrangement of the drive mechanism 350 may be replaced by a servo motor and cam 500 configuration. In particular, the servo motor (not shown) and cam 500 cooperate to drive and control the position of the first and second valve actuators 308 and 310 as described in connection with FIGS. 4A and 4B. The servo motor (not shown) may be an EXI micro servo model S1123 9G or other similar device. In this exemplary embodiment, the first and second valve actuators 308 and 310 are biased towards the fluid chamber 314 by springs 502 and 504, respectively. In this configuration, the valve stems 320 and 322 are extended towards the cam 500 and the tips 320*a* and 322*a* of the valve stems are maintained in contact with the lobed surface 500*a* of the cam 500. Thus, the biased valve stems 320 and 322 operate as cam followers that translate the rotary motion of the cam 500 about a center of rotation or fixed point 508 into a linear translation to alter the size of the flow paths 406 and 506. The center of rotation or fixed point 308 may be disposed at a central axis of the cam 500 or offset from the central axis (or center of mass) as discussed below.

The lobed surface 500*a* of the cam 500 may be designed to be non-spherical relative to the fixed point 508 including a first radius r corresponding to the closed position of the valve actuators 306 and 308, and a second radius r+x corresponding to the open position of on of the valve actuators 308 and 310. The distance x represents the total travel distance between the open and closed positions of either of the valve stems 320 or 322. Transition surfaces 510 and 512 defined between the first radius r and the second radius r+x provide a means or mechanism by which fine adjustments and modifications of the valve stems 320 and 322 may be affected to control the relative size of the flow paths 406 and 506 and ultimately the airflow through each of the valve actuators 308 and 310. The lobed surface 500*a* may further include a bump (not shown) or other protuberance positioned to break any mechanical seal that may be formed between the conical portion 400 and the circular mouth 404 of the orifice portion 402.

FIG. 6 depicts a functional representation of an electronic subassembly 600 that may be implemented to control and drive one or more embodiments of the pneumatic subassembly 300. In particular, the illustrated control architecture includes logical blocks representing components and devices supported by and/or electrically coupled to the PCB 304 carried by the base 104. The electronic subassembly 600 includes circuit traces which may be manufactured integral to the PCB 304 and arranged to form a communications bus and circuitry 602 that electrically and communicatively couples an input conditioner 604, a stepper controller 606, a power supply 608, a feedback conditioner 610, a maximum airflow rate controller 614, a pulse generator 612, a pressure indicator 618 and a pressure controller 620. The electronic subassembly 600 and the associated components, circuit blocks and functional modules are configured to provide dynamic performance and control over the pneumatic subassembly 300 by modulating and controlling the valve actuators 306 and 308, and correspondingly the airflow near a set point or threshold to prevent overshoot and oscillation. The components, circuit blocks and functional modules may be implemented as software code or instructions executing on a processor or as hardware descriptive language executing on application specific hardware designed to provide the desired functionality. The disclosed control methodology implemented by the electronic subassembly 600 provides steady airflow and ensures high-speed supply and exhaust performance.

The input conditioner 604, in one embodiment, receives an input or control signal from, for example, one or more of the controls 118a to 118e and/or the inputs 114a to 114f and converts the respective signal to a specified output format. For example, the input conditioner 604 may, as indicated by the control 118a, be configured to receive a voltage input or a current input representing a pressure set point and convert that input to a corresponding pressure. In one embodiment, the input conditioner 604 determines whether a 0 to 10 VDC control signal is converted to a 0 to 20 pounds per square inch gauge (PSIG) control signal, or whether a 4 to 20 mA control signal is converted to a 3 to 15 PSIG control signal. Adjustment of these parameters may be accomplished via the controls 18 shown in FIG. 1 and further discussed in connection with the operational flowchart shown in FIG. 9.

The pulse generator 612 may be configured to generate the electrical pulses, steps and square wave signals utilized by the stepper controller 606. The generated pulses may, for example, be square wave pulses having a fixed frequency of 200 Hz (1/sec). This fixed frequency may vary by configuration and hardware to allow the drive mechanism 350 to continuously operate at maximum rated torque. In an exemplary embodiment, the duty cycle of the 200 Hz pulse provides the step signal to the linear stepper drive mechanism 350 to produce a desired movement of the respective valve stems 320 and 322. In one exemplary embodiment, the valve stem movement in response to the step signal produces 4 mm of movement in either of the valve stems 320 and 322 in 0.021 mm per step increments over a period of one (1) second. The valve stem movement of stems 320 and 322 alters the flow path 406 associated with the corresponding valve stem 320 and 322 to produce a pre-determined air flow in standard cubic inches per minute (SCIM). For example, at time t equals 1 ms, one of the valve stems 320 and 322 has moved 0.04 mm and opened the flow path 406 to a maximum flow rate of 40 SCIM. After 1 sec, the active valve stem has moved 4 mm such that the air flow through the now-open flow path 406 of one of the valve stems 320 or 322 is a maximum of 1400 SCIM. The precise position of the valve stem is controlled as a function of the pressure controller 616 acting on and in conjunction with the stepper controller 606 based on the feedback conditioner 610, the input conditioner 604 and the pulse generator 612.

The stepper controller 606 interfaces with and controls the drive mechanism 350. For example, if the input conditioner 604 corresponds to a change in the pressure set point in excess of the value of the feedback conditioner 610 and the maximum air flow rate controller 614 corresponds to a desired flow rate of 600 SCIM, then the stepper controller 606 may calculate and determine, via the pulse generator 612, the direction to open the exhaust valve actuator 308 in order to linearly increase the air flow through the flow path 406 to the desired flow rate. The communicated position data may, in turn, be used to drive the linear stepper motor configured drive mechanism 350, and ultimately the actuating post 316, to a specific position corresponding to a flow path 406 configuration that results in the desired flow rate. The position of the actuating post 318 and the associated valve stem 320 or 322 determines the area of the flow path defined between the conical portion 400 of the valve stem 320 and the orifice portion 402.

The electrical subassembly 600 may further include, or be in communication with, the exemplary power supply 608. The power supply 608 may be a separate component or may be integral to the PCB 304. In one exemplary embodiment, the power supply 608 is integral to the PCB 304 and configured to receive signals from the terminal block or input 114f. In another embodiment, the power supply 608 may receive power from a separate transformer operating as a 24 VDC source supplying a 0 to 10 VDC. The exemplary power supply 608 may bean energy harvesting power supply such as a piezoelectric energy harvesting power supply configured to capture, accumulate and store energy for use by the electrical assembly 600. The power supply 608 may further be configured to supply DC power to the drive mechanism 350.

The feedback conditioner 610 may, in an exemplary embodiment, include and incorporate a pressure sensor 616 (see FIG. 3) configured to measure the pressure present within the fluid chamber 314. In one embodiment, the feedback conditioner 610 receives a 0 to 40 mV pressure signal generated by the pressure sensor 616 (see FIG. 3). The magnitude of the pressure signal represents the detected pressure within the fluid chamber 314. The feedback conditioner 610 may, in turn, amplify the generated millivolt pressure signal to a corresponding 0 to 5 VDC signal for use by, and communication to, the pressure controller 620.

The electronic subassembly 600 may further cooperate with and control the pressure indicator 618. In one embodiment, the pressure indicator 618 couples to and/or controls the pressure scale 120 or the pressure gauge 122. In another embodiment, the pressure indicator 618 may couple to and control a light emitting diode (LED) array or other display mechanism for providing pressure and flow rate information to the user.

The pressure controller 620 may be in communication with each of the components and elements of the electronic subassembly 600 via the circuit traces and communication bus 602. In one exemplary embodiment, the pressure controller 620 utilizes the information gathered and processed by the individual components and modules of the electronic subassembly 600 to control and direct the overall operation of the variable airflow module 100. The pressure controller 620 may include and control both hardware and software elements programmed and configured to effect the desired control.

In another exemplary embodiment, the electronic subassembly 600 and the associated components, circuit blocks and functional modules may be modified and reconfigured to provide dynamic performance and control of the cam 500 and servo motor configuration of the pneumatic subassembly 300. In this exemplary configuration, the stepper controller 606 may be eliminated and the pulse generator 612 may configured to generate the pulses and square wave signals required by the pressure controller 620 to directly drive the servo motor (not shown) to selectively rotate the cam 500 to correspondingly drive the valve stems 320 and 322 to control the flow rate 406 into and out of the chamber 314 as described herein. For example, the generated pulses may be square wave signals having a fixed frequency of 50 Hz (1/sec) that provide step inputs to the servo motor. In other embodiments and applications, the fixed frequency may be varied by duty cycle from a nominal 1500 µs±700 µs that allows the servo motor configuration of the drive mechanism 350 to rotate 75° left or right of a neutral position about point 508. The movement of the servo motor from the neutral position about the point 508 rotates the cam 500 causing translation in one of the valve stems 320 and 322. The neutral position corresponds to both valve stems 320 and 322 in a closed position and a 0 SCIM air flow. In particular, rotation of the cam 500 can cause the valve stems 320 and 322 to translation 4 mm in a period of 1.5 seconds. The precise linear translation caused by the rotation of the cam 500 about the point 508 is dictated by the shape and profile of the transition surfaces 510 and 520 formed contiguous with the lobed surface 500a shown in FIG. 5.

In one exemplary configuration, the servo motor configuration of the drive mechanism 350 may be sized and selected to operate at a maximum rated torque of 1.4 kg/cm and generate up to 100N (22.5 lb) of force against the lobed surface 500a. When the cam 500 rotates clockwise about the point 508 (i.e., about an axis defined perpendicular to the plane of the cam 500 shown in FIG. 5), the force generated between the tip 320a of the valve stem 320 and the lobed surface 500a causes the spring 502 to compress as the valve stem 320 translates a distance x (see FIG. 5). The movement of the valve stem 320 causes the flow path 406 through the valve actuator 308 controlling the fluid supply into the chamber 314 to open resulting in a change in air flow (measured in standard cubic inches per minute (SCIM)) there through. Rotation of the cam 500 in a counterclockwise direction (relative to the axis defined perpendicular to the plane of the cam 500 shown in FIG. 5) produces a similar response in the valve stem 322 and associate components. In operation, the maximum air flow rate controller 614 may cooperate with the pulse generator 612 and the pressure controller 620 to limit the maximum number of pulses and the associated rotation from the neutral position. As the cam 500 rotates and the tips 320a and 322a bear against the lobed surface 500a, the corresponding valve stems 320 and 322 cooperate and linearly shift to produce a selected maximum flow rate of 40 SCIM at 0.04 mm after 15 ms. After 0.15 seconds of continued linear translation, the flow rate through the corresponding valve stem 320 and 322 achieves a maximum flow rate of 1400 SCIM at 4 mm Turning to FIG. 7, an exemplary embodiment of pressure controller 620 is disclosed. This exemplary embodiment of the pressure controller 620 may be disposed external to the variable airflow module 100 but in communication with the electronic subassembly 600 of the variable airflow module 100. The pressure controller 620 may be a single device such as a building automation controller, a collection of electrically coupled devices communicating via a distributed network such as a BACnet-configured network or any other known of later developed configurations. For example, the process controller 620 may include a processor 702 in communication with an input-output (I/O) module 704 and a memory 706 configured to store processor executable instructions comprising a pressure control program 700 (see FIG. 7). The processor 702 may be a central processing unit (CPU) configured to implement the stored processor-executable instructions, program code, code modules, and applications that dictate and control the communication of data, the storage and retrieval of data, and the analysis of data organized within the memory of 706. The processor 702 may further include additional internal memory (not shown) to facilitate the organization and processing of data. The I/O module 704 may be an internal or external module configured to cooperate with the pressure control program 700 to receive and transmit data between devices operable within a building automation or control system.

The memory 706 may contain different logical and/or physical partitions configured to cooperate with, for example, the processor 702. The memory 706 may be a hard drive, solid state drive, random access memory (RAM), read only memory (ROM) or any other known or later developed addressable storage medium. The memory 706 may be configured to store a firmware module or library 708 containing the software and executable instructions that establish the basic functionality and capabilities of the variable airflow module 100. For example, the firmware module 708 may include, among other things, memory structures that may be utilized and populated by the processor 702, communication protocols that may format and organize information exchanges through the I/O module 704, and other data analysis and tracking functionality that may be utilized by, for example, the GPU.

FIG. 8 illustrates an exemplary process control loop 800 operable, for example, within a building automation system to provide selective and/or incremental control of a pneumatic actuator coupled to a damper, valve or other similar device. As shown in FIG. 8, the process control loop 800 includes a single variable airflow module 100 configured to incrementally control the movement of the pneumatic actuator 816. The exemplary process control loop 800 is configured to provide closed loop control of an air supply 828 indirectly acting on process 814 (e.g., to control a damper or valve device) as governed by pressure control program 700.

The pressure control program 700 executing within the pressure controller 620 generates the process control signal 826 to instruct the variable airflow module 100 to alter or drive the controlled air output 822 (corresponding to the return port 110) toward the set point provided by the pressure control program 700. The pressure control program 700 may further receive one or both of the sensor output 818 and the pneumatic output 824. The pressure control program 700 utilizes the received outputs 818 and 824 as feedback and/or error signals for comparison with respect to the set point. If the set point has not been reached, the pressure control program 700 utilizes the received outputs 818 and 824 to generate a corrected process control signal 826. The corrected process control signal 826, in turn, directs variable airflow module 100 to provide air supply (through supply port 310 controlled via valve stem 310) or exhaust air (through exhaust port 112 controlled via valve stem 308) resulting in a change in the controlled air output 822 (via the return port 108). The effects of the change may subsequently be detected and communicated as the outputs 818 and 824. The correction process repeats until the process control signal 826 is determined to equal the set point, i.e., the feedback and error signals require no additional correction.

The exemplary process control feedback routine 810 may represent any number of closed loop control systems that utilize a sensor 812 to monitor a process control output 814 of the device being controlled such as the pneumatic actuator 816. The sensor output 818 is communicated to I/O module 704 and utilized by the pressure control program 700 of pressure controller 620 to adjust operation of the variable airflow module 100 and the fluidly coupled pneumatic actuator 816. The exemplary control loop 800 may include the pneumatic control feedback routine 820 internal to the variable airflow module 100 as executed and directed by the pressure control program 700. Sensor 616 internal to the variable airflow module 100 monitors air pressure in the fluid chamber 314 (see FIG. 3) directly connected to the controlled air output 822 of the variable airflow module 100 and provides a corresponding voltage output 824 to the pressure control program 700. Based on one or both of the received outputs 818 and 824, the pressure control program 700 may alter and adjust the process control signal 826 to direct the variable airflow module 100 and maintain the operational profile of the pneumatic actuator 816. The operational profile could represent a steady state condition, a programmed or variable condition, or a bounded condition varying or fluctuating within a predefined range or any other control conditions.

Open loop control may be implemented where the received outputs 818 and 824 are not connected to or utilized by the pressure control program 700. In one embodiment, the exemplary open loop control routine 800 may control the relative positions of the internal valve actuators 308 and 310 based completely on the current operating state of the variable airflow module 100 and the known variables and parameters that represent the module. In particular, the open loop control routine in 800 may operate without a feedback 824 or error signal 818 to determine if the generated output has achieved the desired set point. In this embodiment, the open loop control routine does not correct or adjust the pressure control program 700 based on the output 818 provided by the sensor 812. The open loop control routine 800 provides a simple methodology for a well-defined system that incorporates known relationships between inputs and output can be modeled and controlled.

FIG. 9 is an exemplary operational flowchart 900 that represents one method of operating the variable airflow module 100 according to the pressure control program 700 stored and executed by the process controller 620. The exemplary operational method initiates when either (i) an external signal received by I/O module 704 is varied by pressure control program 700 and presented to an input 114a to 114f of the variable airflow module 100, or (ii) one or more of the internal manual inputs 118d and 118c are varied resulting in a change or alteration of the set point stored and accessible by the variable airflow module 100 as discussed in step 912 (step 902). In particular, the control 118a (as shown in FIG. 1) toggles the input type between a current input and a voltage input. If the selected input type is a voltage input (step 904), then the pressure control program 700 is configured to receive a voltage signal via one of the inputs 114a to 114f. The voltage signal may be a 0 to 10 VDC signal that corresponds to a 0 to 20 PSIG controlled air output 822. Alternatively, if the selected input type is a current input (step 906), then the pressure control program 700 is configured to receive an analog current signal via one of the inputs 114a to 114f. The analog current signal may be a 4 to 20 mA signal that corresponds to a 3 to 15 PSIG controlled air output 822.

The pressure control program 700 next evaluates the control 118b to determine if the variable airflow module 100 is operating in an automatic or manual mode. The control 118b toggles between a manual operation mode and an automatic operation mode (step 908.) If the control 118b indicates that the variable airflow module 100 is operating in a manual mode, then the pressure control program 700 reads a voltage value or potential associated with the control 118c (step 910). The control 118c is a manual pot or other rotary selector configured to provide a 3% to 100% output range that may be converted by the pressure control program 700 via the input conditioner 604 to a corresponding and desired 0 to 20 PSIG controlled air output 822. At step 912, the pressure control program 700 utilizes the manually established or the automatically defined set point in conjunction with one or more of the open loop or feedback control routines previously discussed.

The pressure control program 700 generates the process control signal 826 to instruct the variable airflow module 100 to alter or drive the controlled air output 822 (e.g., through the return port 108) toward the set point (step 914). The pressure control program 700 may further receive one or both of the sensor output 818 (step 916) and the pneumatic output 824 (step 918). The pressure control program 700 utilizes the received outputs 818 and 824 as feedback and/or error signals for comparison with respect to the set point (step 920). If the set point has not been reached, the pressure control program 700 utilizes the received outputs 818 and 824 to generate a corrected process control signal 826 (return to step 914). The corrected process control signal 826, in turn, directs the drive mechanism 350 to alter the position of one of the valve actuators 308 and 310. The altered position of one of the valve actuators 308 and 310 results in a change in the controlled air output 822. The effects of the change may subsequently be detected and communicated as the outputs 818 and 824. The correction process repeats until the process control signal 826 is determined to equal the set point, (i.e., the feedback and error signals require no additional correction).

Calculations and processes at step 920 include a decision point on time remaining for feedback to reach set point cooperating with time to close valve from current position. When a decision point is reached by the control program 700, the open valve (e.g., the valve actuator 308 or 310) will start to linearly close such that the respective valve will fully close at the time the feedback signal matches set point signal; in other words, when pressure out of the return port 108 or air output 822 equals pressure selected (i.e., the current set point). During this sequence of operation it is not necessary that airflow through return port 108 or provided as air output 822 of the variable airflow module 100 reach maximum only that it does not exceed a pre-defined maximum threshold. Feedback conditioner 610 uses pressure sensor 616 in return air chamber 314 to determine if the output pressure corresponding to the return port 108 and/or air output 822 is lower, the same or higher than the set point input based on feedback conditioner 610, input conditioner 604 and pulse generator 612.

Herein, the phrases "coupled with", "in communication with" and "connected to" are defined to mean components arranged to directly or indirectly exchange information, data and commands through one or more intermediate components. The intermediate components may include both hardware and software based components. The phrase "operatively coupled" is defined to mean two or more devices configured to share resources or information either directly or indirectly through one or more intermediate components.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:
1. A variable flow device comprising:
a body in an air damper, the body supporting a first orifice and a second orifice, the first orifice being an air supply orifice connected with an air supply and the second orifice being an exhaust orifice connected to exhaust to atmosphere, the body configured to connect the air supply orifice and the exhaust orifice with a duct of the air damper;
a drive mechanism configured to control air flow to the duct;
a first valve actuator coupled to the drive mechanism and linearly shiftable between a first open position and a first closed position, the first valve actuator comprising: a first valve stem including a first conical portion, wherein the first conical portion is sized to symmetrically engage the first orifice when the first valve stem is shifted to the first closed position; and a second valve actuator coupled to the drive mechanism and linearly shiftable between a second open position and a second closed position, the second valve actuator comprising:

a second valve stem including a second conical portion, wherein the second conical portion is sized to symmetrically engage the second orifice when the second valve stem is shifted to the second closed position; and wherein the drive mechanism is configured to direct the first conical portion to control the first valve actuator and the second conical portion to control the second valve actuator, the drive mechanism being responsive to a building automation controller.

2. The device of claim 1, wherein the drive mechanism includes a cam in rotational contact with the first valve stem and the second valve stem.

3. The device of claim 1, wherein the drive mechanism includes a linear stepper motor configured to drive a linear actuating pin.

4. The device of claim 3, wherein the linear actuating pin includes an actuating post configured to alternately bear against a first working surface of the first valve stem and a second working surface of the second valve stem.

5. The device of claim 1, wherein a first distance between the first conical portion and the first orifice defines a first fluid path having a cross-section that varies directly as a function of the first distance.

6. The device of claim 5, wherein a second distance between the second conical portion and the second orifice defines a second fluid path having a cross-section that varies directly as a function of the second distance.

7. The device of claim 6 further comprising:
the building automation controller coupled to the drive mechanism, wherein the controller includes a processor and a memory storing processor executable instructions configured to:
  convert a received electrical signal to a corresponding pressure signal;
  generate a flow rate signal corresponding to the pressure signal; and
  communicate the flow rate signal to the drive mechanism, wherein the drive mechanism translates one of the valve actuators according to the flow rate signal.

8. The device of claim 7, wherein the building automation controller is further configured to:
direct, according to the flow rate signal, the drive mechanism to position the first valve actuator relative to the second valve actuator in order to maintain a constant pressure within a chamber that fluidly couples the first orifice to the second orifice.

9. A variable flow device comprising:
a body having a first orifice and a second orifice, wherein the first orifice is in fluid communication with the second orifice via a fluid chamber;
a motor for translation of a drive pin between a first position and a second position, wherein the drive pin includes an actuating post extending substantially orthogonal from an outer surface of the drive pin;
a first valve actuator including a first valve stem configured to symmetrically engage the first orifice, wherein the first valve stem is shiftable relative to the first orifice in response to the translation of the actuating post substantially adjacent to the first position; and a second valve actuator including a second valve stem configured to symmetrically engage the second orifice, wherein the second valve stem is shiftable relative to the second orifice in response to the translation of the actuating post substantially adjacent to the second position;

wherein the motor comprises a drive shaft extending parallel to the first and second valve actuators and connecting with the drive pin, which is inline with the drive shaft so also parallel with the first and second valve actuators, and the actuating post is a single post with two opposite sides, a first of the opposite sides for contacting the first valve stem and a second of the opposite sides for contacting the second valve stem.

10. The device of claim 9, wherein the actuating post is configured to bear against a first working surface of the first valve stem and a second working surface of the second valve stem.

11. The device of claim 9, wherein the first valve stem includes a first conical portion sized to selectively engage and seal the first orifice.

12. The device of claim 11, wherein the first conical portion and the first orifice define a first fluid path having a symmetrical cross-section that varies directly with the distance between the first conical portion and the first orifice.

13. The device of claim 9, wherein the second valve stem includes a second conical portion sized to selectively engage and seal the second orifice.

14. The device of claim 13, wherein the second conical portion and the second orifice define a second fluid path having a symmetrical cross-section that varies directly with the distance between the second conical portion and the second orifice.

15. The device of claim 9, wherein the motor for translation is a linear stepper motor.

16. A method for variable flow control of air in an air damper by a transducer device including a body having a first orifice in fluid communication with a supply port, and a second orifice in fluid communication with an exhaust port, wherein the first orifice is further in fluid communication with the second orifice via a fluid chamber having a fluid output port, the method comprising:
receiving an electrical signal representative of a pressure set point of the air of the air damper, the electrical signal received from a building automation controller;
calculating, in response to the received electrical signal, a flow rate corresponding to the pressure set point;
generating a position signal that corresponds to the flow rate associated with the pressure set point;
selecting one of a first valve actuator and a second valve actuator as an active valve actuator, wherein the first valve actuator is arranged to selectively engage the first air supply orifice with an air supply and wherein the second valve actuator is arranged to selectively engage the second exhaust orifice to exhaust to atmosphere; and
positioning, in response to the generated position signal, a conical portion of the selected active valve actuator adjacent to one of the first or second orifices, wherein the conical portion and the orifice cooperate to define a flow area corresponding to the calculated flow rate of the air damper.

17. The method of claim 16 further comprising:
generating a feedback signal representing a pressure difference, wherein the pressure difference is the difference between a measured pressure at the fluid output port and the pressure set point.

18. The method of claim 16 further comprising:
adjusting the position signal in response to the feedback signal, wherein the adjusted position signal alters the flow area and the corresponding flow rate.

19. The method of claim 16, wherein selecting one of the first valve actuator and the second valve actuator as the active valve actuator further comprises:
driving an actuating pin via a linear stepper motor, the actuating pin being parallel to the first and second valve actuators, wherein the actuating pin includes an actuating post arranged substantially orthogonal to a body of the actuating pin; and
engaging, via the actuating pin, a tip of a valve stem carried within the selected one of the first valve actuator and the second valve actuator, the actuating post being a single post with two opposite sides, a first of the opposite sides engaging the tip of the selected one and a second of the opposite sides being for engaging the other one for the first and second valve actuators.

20. The method of claim 16, wherein selecting one of the first valve actuator and the second valve actuator as the active valve actuator further comprises:
rotating, via a servo motor, a cam having a lobed cam surface arranged to engage a first tip of a first valve stem carried within the first valve actuator, and a second tip of a second valve stem carried within the second valve actuator;
wherein a change in an angular orientation of the cam causes the a linear shift in the first and second valve stems as the first and second tip follows along the lobed cam surface.

21. The variable flow device of claim 1 wherein the drive mechanism comprises a motor with a drive shaft extending parallel to the first and second valve actuators and connecting with a drive pin, which is inline with the drive shaft so also parallel with the first and second valve actuators, the drive pin connected to an actuating post extending substantially orthogonal from an outer surface of the drive pin, the actuating post coupling the first and second valve actuators to the motor.

22. The method of claim 16 wherein positioning comprises moving a drive shaft extending parallel to the first and second valve actuators and connecting with a drive pin, which is inline with the drive shaft so also parallel with the first and second valve actuators, the drive pin connected to an actuating post extending substantially orthogonal from an outer surface of the drive pin, the actuating post movement moving the selected one of the first and second valve actuators.

* * * * *